Patented Apr. 28, 1942

2,280,791

UNITED STATES PATENT OFFICE 2,280,791

CYANOALKYL ETHERS OF MONOHYDRIC ALICYCLIC ALCOHOLS

Herman A. Bruson, Philadelphia, Pa., assignor to The Resinous Products & Chemical Company, Philadelphia, Pa.

No Drawing. Application February 21, 1941, Serial No. 379,944

13 Claims. (Cl. 260—464)

This invention relates to β-cyanoalkyl ethers of monohydric alicyclic alcohols and to a method for their preparation.

According to this invention a monohydric alicyclic alcohol of the formula ROH, wherein R is an alicyclic or substituted alicyclic group, is reacted in the presence of an alkaline condensing agent or catalyst with an α,β-unsaturated open chain nitrile of the formula $$CH_2=C(R')CN$$

wherein R' is hydrogen or a methyl group, as found in acrylonitrile or α-methyl acrylonitrile.

As catalysts there may be employed any strongly alkaline agent, such as alkali oxides, hydroxides, amides, alcoholates, or phenates, the alkali or alkaline earth metals themselves, the alkaline earth hydroxides, alkali hydrides, the strongly alkaline quaternary ammonium hydroxides, etc. When, for example, an alkali metal alcoholate is used, it may be sodium or potassium methylate or ethylate, or it may be the alcoholate of the alicyclic alcohol which is reacted with the unsaturated nitrile. In reacting hydrocarbon substituted alicyclic alcohols the quaternary ammonium hydroxides, such as trimethyl benzyl ammonium hydroxide or dodecyl dimethyl benzyl ammonium hydroxide, are particularly effective, probably because of their solubility in the mixture of reactants. From one-half to about five per cent of the catalyst may be used, based on the weight of alcohol employed.

As alicyclic monohydric alcohol, there may be used such compounds as cyclobutanol, cyclopentanol, cyclohexanol, and aryl, aralkyl, cycloalkyl, and aliphatic substituted members of this series, such as methyl cyclohexanol, methyl cyclopentanol, benzyl cyclohexanol, ter-butyl cyclohexanol, ter-amyl cyclohexanol, cyclohexyl cyclohexanol, etc., borneol, fenchol, α- or β-perhydronaphthol, menthol, perhydroabietyl alcohol, or other monohydric alicyclic alcohol having one carbocyclic ring, or more than one ring, or having several fused rings as derived from the hydronaphthalene or hydrophenanthrene series. A valuable series of alicyclic alcohols is obtainable through hydrogenation of isophorones, the preparation of which is described in U. S. Patent No. 2,148,103, issued February 21, 1939.

In effecting the reaction between the alicyclic alcohol and acrylonitrile or methacrylonitrile it is usually most convenient to add the catalyst to the alcohol and slowly add the nitrile to this mixture. During the addition of nitrile it is generally desirable to prevent the temperature of the reacting mixture from rising unduly, thus preventing polymerization of the acrylic compound. The temperature may be controlled by rate of addition or by external cooling, if desired. When mixing has been completed, the reaction mixture may be moderately heated to complete the reaction. Reaction temperatures between about 0° and 70° C. are usually satisfactory. The reaction may be performed in the presence of an inert solvent or suspending agent, such as dioxane, benzene, toluene, etc. When the reaction is complete, it is preferable to overcome the alkalinity before further purification. This may be accomplished by washing with water when the products are, as usual, insoluble in aqueous media or by neutralization with acid. The products vary from oils to solids which are generally distillable under reduced pressure.

The products are useful as intermediates in the preparation of corresponding amines, amides, acids, and esters which are useful in such fields as resins, pharmaceuticals, and insecticides.

The following examples are illustrative of the invention.

Example 1

One part of powdered sodium oxide was added to 56 parts by weight of cyclohexanol and the mixture heated under reflux for 30 minutes at 90–95° C. The cyclohexanol solution was then cooled to about 5° C. and 30 parts by weight of acrylonitrile slowly added while the mixture was stirred. When the addition had been performed, the solution was warmed to about 25° C. and stirred at 25–30° C. for six hours. It was then washed with water several times, separated from water, dried, filtered, and distilled under reduced pressure. There was obtained β-cyclohexyloxy propionitrile in a yield of 60%. The product was a colorless oil which distilled at 119° C. at 10 mm. pressure.

By the same procedure cyclohexanol may be reacted with α-methacrylonitrile, using 35 parts of the latter in place of the 30 parts of acrylonitrile, to give a fair yield of a colorless oil corresponding in composition to the β-cyano-β-methyl ethyl ether of cyclohexanol.

Example 2

53 parts of acrylonitrile was gradually added to 86 parts of cyclopentanol to which had previously been added 2 parts of sodium methylate. The temperature of the mixture was held between 20° C. and 35° C. during the addition. The reaction mixture was then stirred for 18 hours at 20–25° C., mixed with 25 parts of water, neutralized with dilute hydrochloric acid and extracted with 100 parts of ethylene dichloride. The extract was separated, dried, and distilled. After the solvent had been removed, a yield of 81% of a colorless oil, boiling at 122° C. at 22 mm. pressure, was obtained. This oil corresponded in composition to

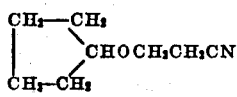

Example 3

15.9 parts of acrylonitrile was added dropwise to a stirred, cooled solution of 0.6 part of sodium methylate in 46.2 parts of fenchyl alcohol at a temperature between 25° C. and 35° C. The mixture was stirred for 2¼ hours at room temperature, then warmed at 45–50° C. for 2 hours. It was cooled, acidified with dilute hydrochloric acid, washed with water, taken up in benzene, filtered, and distilled under reduced pressure. The fraction, boiling at 135–137° C./9 mm. was a colorless oil, the analysis of which agreed with the formula

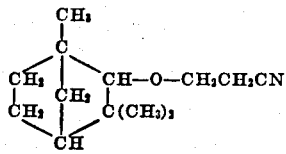

Example 4

A mixture of 42.4 parts of p-α,α,γ,γ-tetramethyl butyl cyclohexanol and 0.5 part of sodium methylate was heated at 80–90° C. until a clear solution was obtained. This was diluted with 50 cc. of benzene, cooled to 25° C., and 10.6 parts of acrylonitrile added dropwise while the mixture was stirred. The mixture was then stirred for 4 hours at 40° C., acidified with dilute hydrochloric acid, washed with water, and the benzene layer separated, washed, and fractionated under reduced pressure. The desired product distilled between 165 and 170° C. at 2 mm. pressure as a colorless oil having the formula

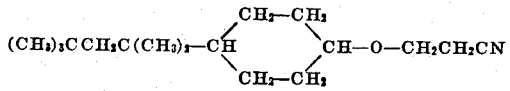

Example 5

To a solution of 50 parts of benzene, 66.8 parts of tetrahydroabietinol, and 0.5 part of sodium methylate there was added dropwise, while the mixture was stirred, 10.6 parts of acrylonitrile at 20–25° C. The mixture was then stirred for 3 hours at room temperature (25–30° C.) and finally heated 3 hours at 40° C. It was then washed with water and dilute hydrochloric acid, and finally with water again. After removal of the benzene, the reaction product was fractionated under reduced pressure and there was obtained 34 parts of tetrahydro-abietyloxypropionitrile boiling at 214–224° C. at 1 mm. pressure as a colorless, viscous oil.

Example 6

To a solution of 46.8 parts of menthol in 50 parts of dioxane containing 2 parts of an aqueous 40% solution of trimethyl benzyl ammonium hydroxide there was added dropwise 15.9 parts of acrylonitrile while the mixture was stirred and maintained at 30°–40° C. by external cooling. After several hours, 200 parts of water was added containing sufficient hydrochloric acid to neutralize the alkali. An oil separated, which was washed with water and distilled in vacuo. The menthyloxypropionitrile

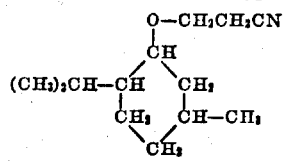

distilled over at 149° C. at 10 mm. pressure as a colorless oil.

Example 7

5 parts of an aqueous solution containing 40% of dimethyl dibenzyl ammonium hydroxide was mixed with 91 parts of 2-cyclohexyl cyclohexanol and 26.5 parts of acrylonitrile slowly added thereto while the mixture was stirred and the temperature was maintained between 30° C. and 40° C. Stirring was continued for three hours and thereupon dilute sulfuric acid was added to neutralize the mixture. The organic materials separated as an oil layer which was separated, washed several times with water, and fractionated at low pressure. The fraction boiling at 154°–156° C. at 1 mm. pressure corresponded according to analysis to β-cyanoethoxyperhydrodiphenyl

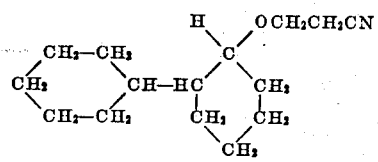

The β-cyanoalkyl ethers which are formed by the reaction illustrated above possess the formula

where R is an alicyclic nucleus and R' is selected from a member of the class consisting of hydrogen and the methyl group. The group R is further distinguished by being a saturated group. The unsaturated compounds have been described in my application Serial No. 371,403, filed December 23, 1940.

I claim:

1. A method for preparing a β-cyanoalkyl ether of a saturated monohydric alicyclic alcohol which comprises reacting said alcohol in the presence of an alkaline condensing agent with a nitrile selected from a member of the group consisting of acrylonitrile and α-methacrylonitrile.

2. A method for preparing a β-cyanoethyl ether of a saturated monohydric alicyclic alcohol which comprises reacting said alcohol in the presence of an alkaline condensing agent with acrylonitrile.

3. A method of preparing a β-cyano-β-methyl ethyl ether of a saturated monohydric alicyclic alcohol which comprises reacting said alcohol in the presence of an alkaline condensing agent with α-methacrylonitrile.

4. A method for preparing a β-cyanoalkyl ether of a saturated monohydric alicyclic alcohol which comprises mixing at a temperature between 0° and 70° C. said alcohol and a nitrile selected from a member of the class consisting of acrylonitrile and α-methacrylonitrile in the presence of an alkaline condensing agent.

5. A method for preparing a β-cyanoethyl ether of a saturated monohydric alicyclic alcohol which comprises mixing at a temperature between 0° C. and 70° C. said alcohol and acrylonitrile in the presence of a quaternary ammonium hydroxide.

6. A method for preparing β-cyanoethyl ether of cyclohexanol which comprises mixing at a temperature between 0° C. and 70° C. cyclohexanol and acrylonitrile in the presence of an alkaline condensing agent.

7. A method for preparing β-cyanoethyl ether of fenchyl alcohol which comprises mixing at a temperature between 0° C. and 70° C. fenchyl alcohol and acrylonitrile in the presence of an alkaline condensing agent.

8. A method for preparing β-cyanoethyl ether of 2-cyclohexyl cyclohexanol which comprises mixing at a temperature between 0° C. and 70° C. 2-cyclohexyl cyclohexanol and acrylonitrile in the presence of an alkaline condensing agent.

9. As a new compound, a β-cyanoalkyl ether of a saturated monohydric alicyclic alcohol, said β-cyanoalkyl group being a member of the class consisting of β-cyanoethyl and β-cyano-β-methyl ethyl radicals.

10. As a new compound, a β-cyanoethyl ether of a saturated monohydric alicyclic alcohol.

11. As a new compound, the β-cyanoethyl ether of cyclohexanol.

12. As a new compound, the β-cyanoethyl ether of fenchyl alcohol.

13. As a new compound, the β-cyanoethyl ether of cyclohexyl cyclohexanol.

HERMAN A. BRUSON.